United States Patent [19]

Ozouf et al.

[11] Patent Number: 5,141,446
[45] Date of Patent: Aug. 25, 1992

[54] DEVICE COMPRISING TWO COMPONENTS THAT ARE HINGED TOGETHER AND THAT ARE INTERCONNECTED BY AN ELECTRICAL CONNECTION

[75] Inventors: René Ozouf, Le Bourget; Jean-Michel Seguin, Asnieres sur Seine, both of France

[73] Assignee: Alcatel Radiotelephone, Paris, France

[21] Appl. No.: 725,701

[22] Filed: Jul. 3, 1991

[30] Foreign Application Priority Data

Jul. 4, 1990 [FR] France ............................ 90 08490

[51] Int. Cl.⁵ ........................................... H01R 35/04
[52] U.S. Cl. ..................................... 439/165; 16/223; 16/337
[58] Field of Search .................. 439/31, 165; 16/223, 16/337, 386

[56] References Cited

FOREIGN PATENT DOCUMENTS 0038066 10/1981 European Pat. Off. .
2194224 2/1974 France .
2399749 3/1979 France .

Primary Examiner—Gary F. Paumen
Attorney, Agent, or Firm—Sughrue, Mion, Zinn, Macpeak & Seas

[57] ABSTRACT

A hinge has an electrical connection contained therein. A first component (1) of two half-shells (11, 12) includes two hollow cylindrical projections (101, 121) having facing end faces provided with respective cylindrical cavities (102, 122) each having one-half contained in a respective one of the half-shells. A second component (2) includes a hollow cylindrical protuberance (201) with two reduced diameter cylindrical ends (202, 203). The projections and the protuberance are designed to axially interfit so as to constitute the hinge connection effected by engagement of the reduced diameter cylindrical ends (202, 203) within respective cylindrical cavities (102, 122). The two components include radial openings for passing portions of the electrical connection between the first and second components.

10 Claims, 2 Drawing Sheets

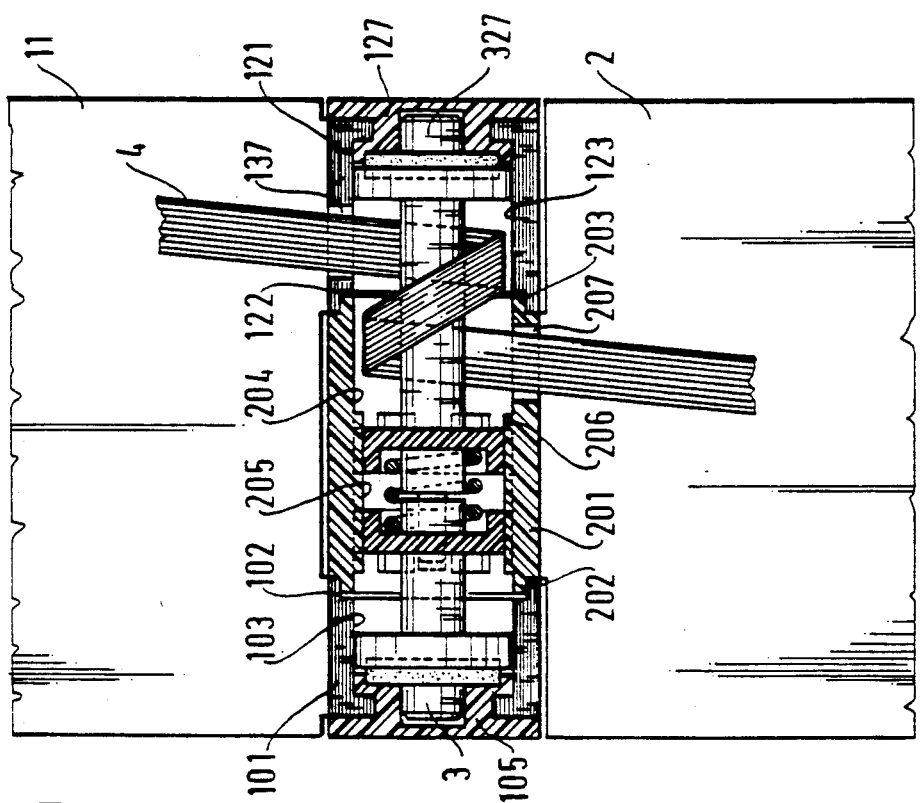
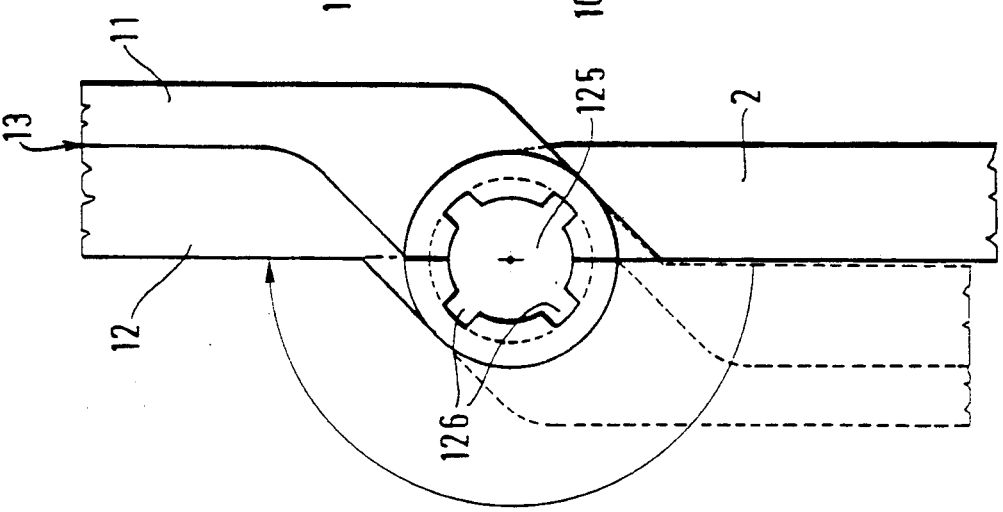

DEVICE COMPRISING TWO COMPONENTS THAT ARE HINGED TOGETHER AND THAT ARE INTERCONNECTED BY AN ELECTRICAL CONNECTION

FIELD OF THE INVENTION

The present invention relates to a device comprising two components that are hinged together and that are interconnected by an electrical connection.

BACKGROUND OF THE INVENTION

Electrical appliances comprising two components that are hinged together often include an electrical connection between the two components. This connection needs to be protected mechanically. It is thus common practice to incorporate the connection with the hinge, and this applies both to connections in the form of twisted wires and to connections in the form of a flexible circuit. When the room available inside the hinge is limited, then so is the number of individual connections that can be provided by means of twisted wires. If a flexible circuit is disposed perpendicularly to the hinge axis, it is subjected to considerable mechanical stress whenever the components rotate relative to each other, and this has a direct effect on the reliability of the electrical connection.

French patent application FR-A-2 194 224 describes a device designed to mitigate these drawbacks, in part. However, the electrical connection follows a path that is pierced through the wall of each of the two hinged components, thereby making it difficult, and in some cases even impossible, to insert the electrical connection into the hinge. In addition, since the hinge described is made conventionally by means of hinge knuckles that are juxtaposed with a certain amount of clearance, rain and dust can infiltrate via the clearance between a knuckle on one component and an adjacent knuckle on the other, and this is objectionable for appliances that are used in a wide range of environments, in particular out-of-doors.

An object of the present invention is thus to provide a device comprising two components that are hinged together and that are interconnected by an electrical connection which is subjected to little stress during rotation, the device also providing good sealing against rain and dust, and facilitating installation of the electrical circuit within the hinge.

SUMMARY OF THE INVENTION

The invention is particularly advantageous in the manufacture of folding portable telephone terminals.

In the device of the invention comprising two components that are hinged together and that are interconnected by an electrical connection which is contained in the hinge, the first of the components includes two projections, one of which is provided with a slot, the second of the components includes a protuberance designed to engage between the projections and provided with another slot, the electrical connection passing through the slots, and in addition the first component comprises two half-shells, with the facing faces of the projections being provided with respective cylindrical cavitys, each having one-half contained in a respective one of the half-shells, the ends of the protuberance are also cylindrical, the protuberance being designed to engage in the projections in order to form the hinge.

In addition, in the device comprising two components that are hinged together and that are interconnected by an electrical connection, said hinge includes guide means in each of said projections, a centering section disposed in a hollow interconnecting the two ends of the protuberance, and a shaft co-operating with the guide means and the centering section, at least one empty space around the shaft extending from a slot in the protuberance to a slot in one of the projections.

In a variant embodiment, the device comprising two components that are hinged together and that are interconnected by an electrical connection includes locking means for preventing the shaft rotating inside the protuberance.

Advantageously, in the device comprising two components that are hinged together and that are interconnected by an electrical connection, the locking means comprise fluting disposed on the centering section and co-operating with grooves of corresponding section on the shaft.

In an embodiment of the device comprising two components that are hinged together and that are interconnected by an electrical connection, the shaft is made up of two half-shafts, one engaged in the other, a spring being disposed between the two half-shafts to urge them apart.

In addition, in the device comprising two components that are hinged together and that are interconnected by an electrical connection, at least one of said projections has a bearing surface facing a friction surface of the shaft, these two surfaces being substantially perpendicular to said shaft, a washer being interposed between said bearing surface and the friction surface in order to brake relative rotation between these two surfaces.

Advantageously, in the device comprising two components that are hinged together and that are interconnected by an electrical connection, the washer is made of felt.

According to an additional characteristic of the device comprising two components that are hinged together and that are interconnected by an electrical connection, since at least one of the projections is provided with an orifice at its end opposite to the cylindrical cavity, it includes a plug designed to be inserted in the orifice, together with fixing means for locking the plug in the projection.

In addition, in the device comprising two components that are hinged together and that are interconnected by an electrical connection, the electrical connection is at least one flexible circuit designed to be wound around the shaft.

Further, the device comprising two components that are hinged together and that are interconnected by an electrical connection, includes locking means for locking the two components in at least one determined position.

An advantageous application of the device of the invention lies in the manufacture of a folding portable telephone appliance.

The various objects and characteristics of the present invention appear more clearly in the context of an embodiment given by way of non-limiting example and with reference to the accompanying figures.

BRIEF DESCRIPTION OF THE DRAWINGS

FIG. 1 is a side view of a device of the invention comprising two components that are hinged together and that are interconnected by an electrical connection;

FIG. 2 is a section view on the midplane of the hinge of the device;

FIG. 3 is a side view of the second component of the device of the invention;

Items that are shown in several of the figures are given the same reference number.

DESCRIPTION OF THE PREFERRED EMBODIMENT

Figure 4:
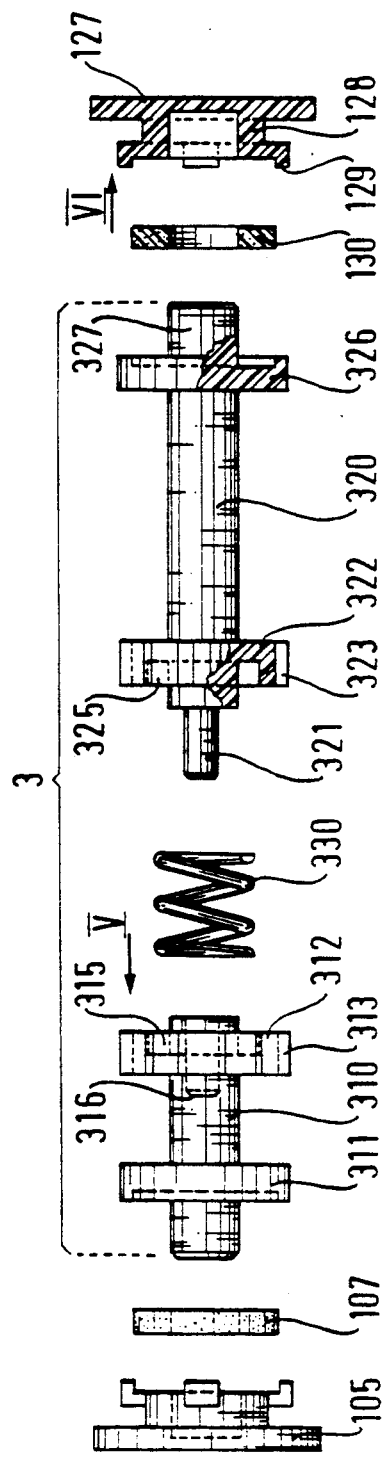
FIG. 4 is an exploded view of the shaft, the washers, and the plugs of the device.

The device of the invention shown from the side in FIG. 1 comprises a first component 1 made up of first and second half-shells 11 and 12, and a second component 2 hinged to the first.

The first component has two projections that are substantially cylindrical in shape and that share the same axis. The separation surface 13 between the two half-shells is such as to split each projection on a plane that contains said axis. The second component 2 is constituted in this case by a single piece and includes a single protuberance that is substantially cylindrical in shape and that is designed to be inserted between the two projections and held on the same axis.

Structural details appear more clearly in FIG. 2 which shows the first half-shell 11 assembled to the second component 2 which is seen in section on a midplane. This figure corresponds to a section view through the device on the separation surface when said surface divides the two projections and the protuberance on a plane parallel to their common axis.

The first projection 101 includes a cylindrical cavity 102 axially facing the protuberance 201. The second projection 121 likewise includes a cylindrical cavity 122 axially facing the protuberance 201. The protuberance 201 has two reduced diameter cylindrical ends 202 and 203 that are slightly smaller in diameter than the cylindrical cavities 102 and 122, and the length of the protuberance is designed to ensure that its ends are engaged in the cylindrical cavities 102, 122 of the projections. Thus, when the two half-shells are assembled together by fixing means (not shown), the two components are free to rotate relative to each other but they are prevented from moving in translation.

The protuberance 201 also appears in FIG. 3 which is a side view of the second component 2.

The means described above thus define a hinge. According to an optional feature for the device of the invention, the hinge further includes a shaft 3 for improving its rigidity and for obtaining other results that are specified below. This shaft 3 also appears in FIG. 4 and comprises two half-shafts which are arbitrarily called herein the "short" shaft 310 and the "long" shaft 320, together with a coil spring 330 having opposite ends bearing against respective half-shafts.

Figure 5:
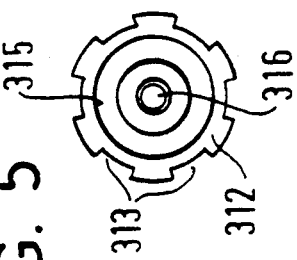
FIG. 5 is an end view of one of the half-shafts of the device.

The short shaft 310 shown end-on in FIG. 5 comprises a first disk 311 which is designed to engage in a cylindrical opening 103 in the first projection 101, with said opening constituting guide means. The short shaft 310 also includes a second disk 312 provided with peripheral fluting 313.

The protuberance 201 of the second component 2 includes a cylindrical hollow bore 204 that passes through it from one end to the other. On a centering section 205 of this hollow bore, there are longitudinal centering parts 206 that project radially from the interior cylindrical surface of the hollow bore.

The fluting 313 in the second disk 312 engages with these centering parts 206 in such a manner as to enable the short shaft 310 to slide inside the protuberance 201 but to prevent it from rotating therein.

In a variant embodiment, the centering section does not have centering parts, in which case the fluting 313 is no longer essential. The diameter of the centering section is nevertheless designed to match that of the second disk.

A groove 315 is disposed in the end face of the second disk 312 that faces the long shaft 320. It is designed to receive one end of the coil spring 330.

The short shaft 310 also includes a cylindrical axial hole 316 at its end adjacent to the second disk 312.

The long shaft 320 includes a reduced diameter cylindrical first end 321 sized to engage in the axial hole 316 of the short shaft so that the only relative motion possible between the two half-shafts is translation along their common axis. The long shaft also includes a third disk 322 close to its first end and symmetrical to the second disk 312, the third disk being likewise provided with fluting 323 for engaging with the centering section 205 in the protuberance as described above. The third disk also includes a groove 325 in an end face forming the short shaft 310 sized to receive the second end of the spring 330.

Close to its second end 327, the long shaft 320 also includes a fourth disk 326 sized to engage axially in a cylindrical opening 123 of the second projection 121.

Figure 6:
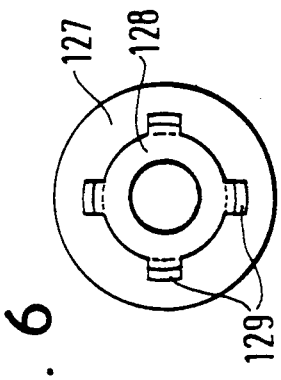
FIG. 6 is an end view of one of the plugs of the device.

The second cylindrical projection 121 seen end-on in FIG. 1 has a circular axial orifice 125 provided with four radial notches 126 at its end opposite to its end that engages the protuberance 201 of the second component 2. The circular orifice 125 is designed to receive a plug 127, FIG. 6, having provided with a cylindrical body 128 which is inserted into the circular orifice 125 of the second projection 121. The body 128 of the plug which appears in section in FIG. 4 and in end face view in FIG. 6 is provided with four radial lugs 129 sized to engage with the notches 126 of the circular orifice 125 so that initially the plug is inserted in end abutment with the lugs 129 engaging the notches 126, and subsequently the plug is rotated through substantially one-eighth of a turn so that the lugs that are then disposed between pairs of notches 126 serve to hold it in place. The center of the plug 127 is axially pierced to receive the second end 327 of the long shaft 320.

A washer 130 is disposed between a friction surface constituted by the face of the fourth disk 326 on the long shaft that faces the plug 127 and a thrust surface which is the corresponding face of the plug. The washer is used to brake relative rotation between the two components and is therefore made of a material which is suitable for this application, e.g. felt.

The first projection 101 includes means that are exactly identical to those described in the above two paragraphs relating to the second projection 121. It is thus fitted with a plug 105 and with a washer 107 disposed between the first disk 311 of the short shaft 310 and the facing end face of said plug 105.

The short shaft 310, the long shaft 320, and the spring 330 are dimensioned to enable them to be inserted between the two plugs 105 and 127, and suitable for ensuring that when the assembly is installed, the spring 330 is compressed to exert a compression force on the two washers 107 and 130.

In the embodiment shown herein, the centering section 205 of the cylindrical protuberance 201 is disposed axially close to the first projection 101. A first radial slot 207 passes radially through the protuberance 201 and opens out into its cylindrical hollow bore 204 between the centering section 205 and its end adjacent to the second projection 121. A second radially slot 137 connects the inside bore of the second cylindrical projection 121 to the body of the first component 1 between the end of said cylindrical projection 121 adjacent to the protuberance 201 and the fourth disk 326 of the long shaft 320. A flexible circuit 4 has a first end inside the body of the first component 1, passes through the second slot 137, is wound helically in one direction or the other around the long shaft 320 between the third and fourth disks 322 and 326, passes through the first slot 207, and terminates at a second end inside the body of the second component 2. This flexible circuit thus provides the electrical connection between the first and second components 1 and 2.

The device also includes locking means for holding the device in a closed position in which the two components 1 and 2 come into contact, and in an open position in which these two components are at a certain angle, e.g. 180°. Such means are known to the person skilled in the art and are therefore neither described, nor shown. They may be constituted by spring clips, for example.

The invention is advantageously used for making a folding portable telephone. In its open position, it thus keeps the earphone and the microphone which are situated in respective ones of the components at an appropriate distance apart, while in its closed position the telephone is more compact.

It is mentioned that the invention still applies even if the shaft 3 is omitted. It also applies if the shaft is made as a single piece rather than being constituted by two half-shafts.

Similarly, the spring 330 may be omitted from an embodiment of the invention, with the main function of the spring being to compress the washers 107 and 130 and to take up manufacturing tolerances, if any.

The invention is also applicable if the washers are omitted or if only one washer is used.

The invention also applies if the centering means constituted by the centering section 205 and the fluting on the second and third disks 312 and 322 that constrain the shaft 3 and the second component 2 to rotate together are absent or if they are implemented differently. The person skilled in the art is aware of numerous equivalent means.

It is also specified that the plugs 105 and 107 are not essential means in the context of the present invention. They are provided to facilitate assembly and disassembly. However, they may be omitted or replaced by equivalent means, in particular by integrating them directly in respective ones of the projections 101 and 121.

Further, the electrical connection may take any other form that comes within the limits of the invention. For example, the flexible circuit 4 may take an arbitrary number of helical turns between the two slots 137 and 207. It may alternatively be constituted by a set of wires, by a flat cable, or otherwise. The term "electrical connection" must be understood broadly, and in particular it is not necessarily implemented in the form of a single assembly. Thus, if the centering section 205 is disposed in the middle of the protuberance 201, then it is easy to provide a third slot between said centering section and the first projection 101 symmetrical to the first slot 207, and to provide a fourth slot in the first projection 101 identical to the second slot 130 in the second projection 121. A second flexible circuit could then be disposed in the same way as the first.

We claim:

1. In a hinge providing a mechanical connection between first and second components of a device, said hinge comprising: means defining a space for accommodating an electrical connection extending from said first component to the second component and including two axially spaced cylindrical projections extending from said first component, one of said cylindrical projections being provided with a radial slot, a cylindrical protuberance extending from said second component, said cylindrical protuberance being sized to fit between said cylindrical projections and being provided with another radial slot, said electrical connection passing through said radial slots, the improvement wherein: said first component comprises two half shells, facing end faces of said cylindrical projections being provided with respective cylindrical cavities, each cylindrical cavity having one half thereof contained in a respective one of said half-shells, and wherein the ends of said cylindrical protuberance are cylindrical, said protuberance being engaged in said respective cavities of said cylindrical projections to form a hinge connection therebetween, after said two half-shells are assembled.

2. A hinge according to claim 1 including guide means in each of said projections, a hollow bore interconnecting the two ends of said protuberance and being provided with a centering section, a shaft engaging said guide means and said centering section, and at least one empty space around said shaft extending from one to the other of said radial slots for passage of said electrical connection.

3. A hinge according to claim 2, further including locking means internally of said cylindrical protuberance for preventing said shaft from rotating inside said protuberance.

4. A hinge according to claim 3, wherein said locking means comprise centering pieces disposed on said centering section and engaging fluting of a corresponding section of said shaft.

5. A hinge according to claim 2, wherein said shaft is made of two half-shafts axially engaged one in the other, and a coil spring disposed coaxially between said half-shafts and urging them axially apart.

6. A hinge according to claim 2, wherein at least one of said projections has a bearing surface facing a friction surface of said shaft, said two surfaces being substantially perpendicular to the axis of said shaft, and a washer is interposed between said bearing surface and said friction surface to brake relative rotation between said two surface.

7. A hinge according to claim 6, wherein said washer is made of felt.

8. A hinge according to claim 2, wherein at least one of said projections comprises an axial orifice within an end thereof opposite to said cylindrical cavity, and said orifice further comprising fixing means for locking an axial plug in said projection.

9. A hinge according to claim 2, wherein said electrical connection is a flexible circuit wound around said shaft and having ends each passing through a respective said radial slot.

10. A hinge according to claim 1, wherein said device is a folding portable telephone.

* * * * *